Dec. 8, 1964   P. P. GOTTSCHALL ETAL   3,160,741
APPARATUS FOR EVALUATING STRIP MATERIAL
Filed Sept. 19, 1960
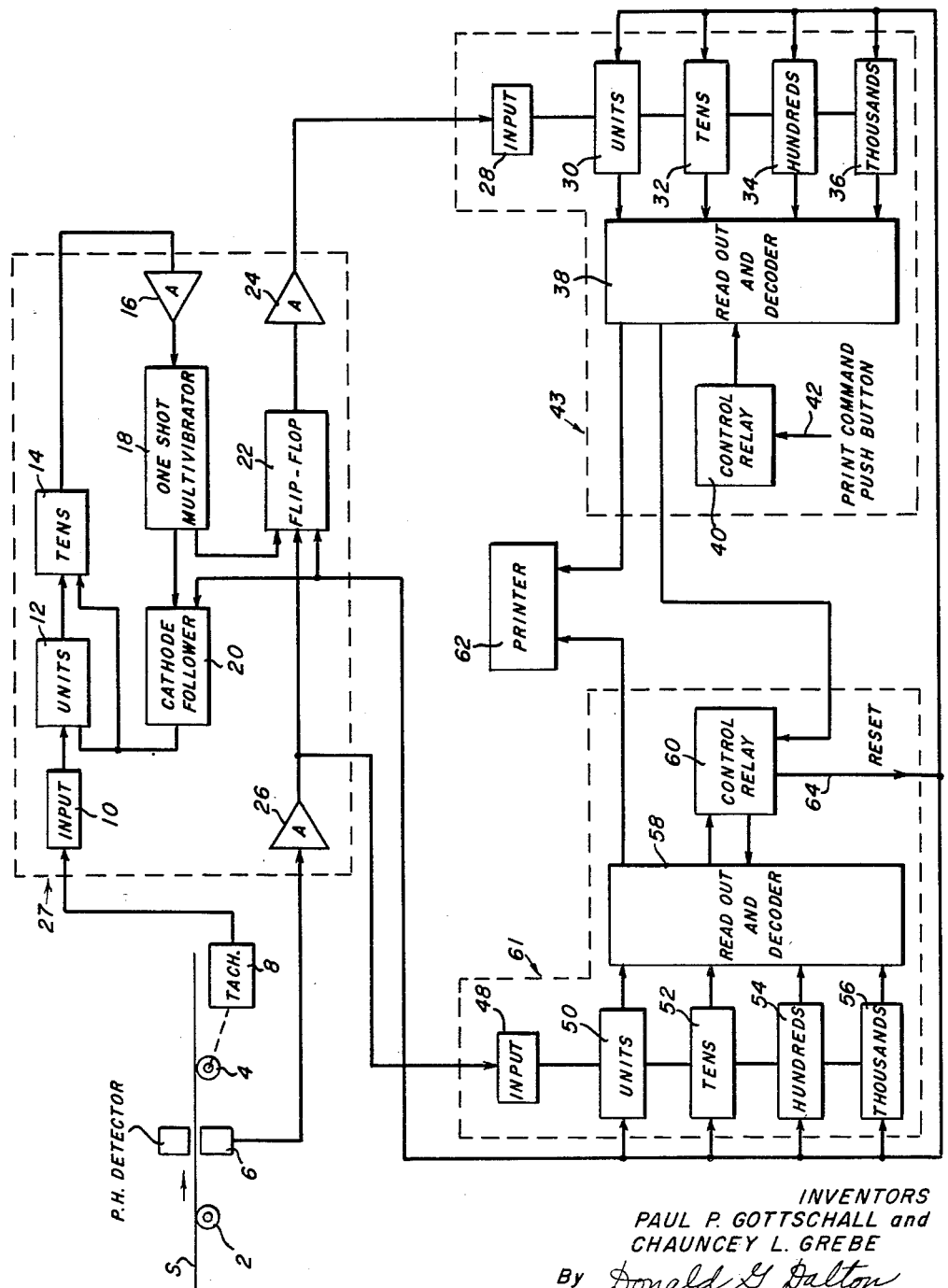
INVENTORS
PAUL P. GOTTSCHALL and
CHAUNCEY L. GREBE
By Donald G. Dalton
Attorney

United States Patent Office 3,160,741
Patented Dec. 8, 1964

3,160,741
APPARATUS FOR EVALUATING STRIP MATERIAL
Paul P. Gottschall and Chauncey L. Grebe, Concord, Calif., assignors to United States Steel Corporation, a corporation of New Jersey
Filed Sept. 19, 1960, Ser. No. 57,050
2 Claims. (Cl. 235—92)

This invention relates to apparatus for evaluating the quality of strip and more particularly to evaluating tin plated steel strip with respect to the number and distribution of pinholes in a length or a coil of such strip. During rolling of the strip pinholes often develop which detract from the quality of the finished product and makes it unsuitable for many purposes. In many cases the strip it cut into sheets of predetermined lengths for further processing. At present each length of strip is normally processed to produce the sheets without any knowledge of the number of perforated sheets that will be produced. If excessive pinholes appear in a given coil, the coil or sheets formed therefrom must be scrapped. Therefore it is important to know the total number and distribution of pinholes in a coil in order to evaluate its quality and to determine whether or not it is worth while to form it into sheets or otherwise further process it.

It is therefore an object of our invention to provide apparatus for determining the total number of pinholes in given coil or length of strip and the distribution of the pinholes along the length of the strip.

Another object is to provide such apparatus whereby the total number of pinholes and the total number of sheets of any theoretical length containing pinholes can be rapidly determined.

A further object is to provide such apparatus in which the information obtained may be automatically recorded in usable form.

These and other objects will be more apparent after referring to the following specification and attached drawing, in which the single figure is a block diagram of a preferred embodiment of our invention.

Referring more particularly to the drawing reference letter S indicates a steel strip passing over rolls 2 and 4, preferably arranged near the exit end of an electrolytic tinning line. A conventional pinhole detector 6 which is located between the rolls 2 and 4 produces an electric pulse each time a pinhole is detected in the moving strip. A tachometer generator 8 is connected to roll 4 so as to be driven at a speed equal to or proportional to strip speed and is arranged to produce an electric pulse for each inch of strip that passes over roll 4. Thus the output of the tachometer generator 8 is a series of electric pulses, each pulse indicating that one inch of the length of the strip has passed the pinhole detector 6. The output of the tachometer generator 8 is connected to an input circuit 10 which amplifies and shapes the pulses in a conventional manner. The output of the input circuit 10 is connected to a preset counter 12 which is a conventional decimal counter, for example, a Berkeley, Model Number 730A. The counter 12 permits any number from one to ten inclusive to be preselected and when such number of pulses has been counted an output pulse is produced. The counter 12 also produces an output pulse when ten pulses have been counted. This latter pulse is fed into a second counter 14 which is identical to the counter 12. The counters 12 and 14 may be arranged as a single counter. Because counter 14 receives a pulse for each ten pulses received by the counter 12, the two counters 12 and 14 cooperate to permit any preselected number of pulses (actually inches of strip passing the pinhole detector 6) between 0 and 99 inclusive to be counted and to produce an output pulse when that number occurs. This pulse is amplified by an amplifier 16 and is then fed into a "one-shot" or monostable multivibrator 18. This is a well known circuit and has the characteristic that a square wave output is produced when excited by a pulse input. The width of the square wave may be selected by adjustment of the circuit parameters of the multivibrator 18. The square wave output of the multivibrator 18 is amplified by a cathode follower 20 from which it is used to reset the counters 12 and 14 after the preselected number of pulses from the tachometer 8 have been counted. The cathode follower has substantially unity voltage gain and is used here as a current amplifier and impedance matching device. The square wave output of the multivibrator 18 is also connected to one input of a conventional flip-flop or bistable multivibrator 22. The flip-flop 22 has the characteristic that the level of its output may be one of two voltages depending on which of the two inputs has last been energized. The output of the flip-flop 22 is connected to the input of an A.C. amplifier 24 having a capacitor in series with the grid at the input and which is so biased that it will respond only to a positive going signal from the flip-flop 22. Therefore, the output pulse of the amplifier 24 will be a negative pulse. The output of the pinhole detector 6 is connected to the input of an amplifier 26 which is similar to the amplifier 24 and in one installation of our invention the two amplifiers are the two sides of a twin triode vacuum tube. The output of the amplifier 26 is connected to the other input of the flip-flop 22. The elements described above and shown in block 27 are available in one unit manufactured by the Berkeley Scientific Corporation under Model Number 5422–1. This unit also contains the necessary power supplies.

The output of the amplifier 24 is connected to a conventional input circuit 28 which further amplifies and shapes the pulses it receives. The output of input circuit 28 is connected to a reset counter 30 which is a conventional decimal counter, for example, a Berkeley, Model Number 705 AF. This counter is so arranged that it resets itself after each series of ten pulses and also generates an output pulse at that time which is fed into a counter 32. The output pulse generated after each series of ten pulses by the counter 32 is connected to the input of a counter 34 which generates an output pulse after each series of ten pulses fed into it. This output pulse is fed into a counter 36 which is identical to the counters 30, 32, and 34. Thus it is seen that the counters 30, 32, 34, and 36 are connected to form a single counter which can count any number of pulses from 0 to 9999. The outputs of the counters 30, 32, 34, and 36 are fed into a read out and decoder circuit 38. The information is fed into the readout and decoder circuit 38 in parallel form and is converted to serial form therein. The read out and decoder circuit contains conventional relays and stepping switches connected in a manner well known to those skilled in the art. Associated with the read out and decoder circuit 38 is a control relay 40 actuated by a push button 42. When the information stored in the counters 30, 32, 34, and 36 in parallel form is desired at the output of the read out and decoder circuit 38 in serial form, the operation of the push button 42 causes the relay 40 to actuate the readout and decoder circuit 38 to produce this result. The control relay 40 and the push button 42 are well known elements and are connected in a conventional manner. The elements shown in block 43 are available in one unit manufactured by the Berkeley Scientific Corporation under Model Number 1554–2. This unit also contains the necessary power supplies.

The output of the amplifier 26 is connected to an input circuit 48 which is identical to the input circuit 28. Associated with the input circuit 48 are counters 50, 52, 54, and 56 which are identical to counters 30, 32, 34, and 36 and are inter-connected with one another in the same fashion as are the latter group of counters. A read out and decoder circuit 58, identical to the read out and decoder circuit 38, is connected to the counters 50, 52, 54, and 56 in the same manner as the read out and decoder circuit 38 is connected to the counters 30, 32, 34, and 36. A control relay 60, which is substantially identical to the control relay 40, is actuated by a signal from the read out and decoder circuit 38 when the read out and decoder circuit 40 is actuated by the push button 42. This permits access to the information stored in counters 30, 32, 34, 36, 50, 52, 54, and 56 by the operation of the push button 42. The elements shown in block 61 are available in a unit manufactured by the Berkeley Scientific Corporation under Model Number 1554–3. This unit also contains the necessary power supplies.

The outputs of the read out and decoder circuits 38 and 58 are connected to an electric printer 62 which receives electric pulses at its input and prints the information so received. The read out and decoder circuits 38 and 58 are arranged so that the printer 62 will first print the information stored in the counters 30, 32, 34, and 36 after which it will print the information stored in the counters 50, 52, 54, and 56. An example of a commercially available printer which we have used to practice our invention is a Berkeley, Model Number 1450–1. After the information has been printed out as described above a reset pulse is generated by the control relay 60 and is fed to the other components of the system over a wire 64 to restore the system to its original state and ready it for evaluation of another length of strip.

The operation of our apparatus is as follows:

The length of sheets in inches into which the customer is likely to want to divide the coil is preset on the counters 12 and 14. If it is assumed that the coil is to be cut into 30 inch sheets the number zero is preset on the counter 12 and the number three is preset on the counter 14. As the strip S passes through the line, the tachometer generator 8 will produce an electric pulse for each inch of strip that passes over roll 4 and these pulses will be counted by the counters 12 and 14. In the present example, when 30 inches have passed, a pulse will appear at the output of the counter 14 which is amplified by the amplifier 16 and fed to the monostable multivibrator 18. The square wave output of the multivibrator 18 resets the counters 12 and 14 through the cathode follower 20 and also triggers the flip-flop 22 if a pinhole has been detected in the measured length of strip. Each pinhole which is detected by the pinhole detector 6 causes an electric pulse to feed through the amplifier 26 to the flip-flop 22. The first pulse to so reach the flip-flop 22 will cause the output of the flip-flop to change states; that is, the voltage at the output will go from its lowest value to its highest value. This positive going signal is amplified by the amplifier 24 so as to produce a negative pulse at its output. The pulse so produced indicates that the 30 inch length of strip passing the pinhole detector 6 contains at least one pinhole. Subsequent pulses from the pinhole detector 6 will have no effect on the output of flip-flop 22 until the flip-flop 22 has been reset by the square wave from the multivibrator 18. When 30 inches of strip have passed the pinhole detector 6 the multivibrator 18 will cause the flip-flop 22 to be reset. This causes the voltage level at the output of the flip-flop 22 to go from its highest voltage level to its lowest voltage level but this negative going signal has no effect on the amplifier 24. If the 30 inch length had not contained a pinhole, no pulse would have been transmitted through the amplifier 26 to the flip-flop 22. Therefore, the voltage level at the output of the flip-flop 22 would have remained at its lower value and the pulse from the multivibrator 18 (representing that 30 inches of strip have passed) would have had no effect on the flip-flop 22. Thus it is seen that, for each 30 inch portion of strip which contains one or more pinholes, the amplifier 24 produces one pulse and that if that portion contains no pinholes, no pulse is produced at the output of the amplifier 24. In other words, the flip-flop 22 serves to gate the pulse from the pinhole detector 6 to the input circuit 28. The gate is closed by a pulse from the pinhole detector 6 and therefore subsequent pulses from the pinhole detector 6 are not fed through to the input circuit 28 until the gate or flip-flop 22 has been opened by the pulse from the multivibrator 18. The multivibrator 18 generates this pulse only after a 30 inch portion of strip material has moved past the pinhole detector 6 and, therefore, the input circuit 28 receives only one pulse irrespective of how many pinholes may exist in any one theoretical sheet.

The pulses representing sheets containing pinholes are fed through the input circuit 28 to the counters 30, 32, 34, and 36 to register the total number of theoretical sheets containing pinholes. Each pulse produced when a pinhole passes the pinhole detector 6 is amplified by the amplifier 26 and fed to the input circuit 48 and transmitted to the counters 50, 52, 54, and 56 so as to register the total number of pinholes in the strip. To permanently record the number of defective sheets and the total number of pinholes in the length of strip the push button 42 is depressed after all the strip has passed roll 4. Operation of push button 42 actuates control relay 40 which, in turn, causes stepping switches in the read out and decoder 38 to rotate and actuate the printer. Four digits representing the total number of sheets containing pinholes are thus printed on the paper tape in the printer 62. A signal is then automatically sent to the control relay 60 and, in identical fashion, four digits representing the total number of pinholes in the coil is printed on the paper tape in the printer 62. After the information has been printed out the control relay 60 generates a reset pulse which is transmitted over the wire 64 to all components in the system and the apparatus is ready to evaluate another coil of strip.

While one embodiment of our invention has been shown and described, it will be apparent that other adaptations and modifications may be made without departing from the scope of the following claims.

We claim:

1. Apparatus for evaluating a moving metal strip comprising a pin hole detector, means for moving the strip past said pin hole detector, means operable by said pin hole detector for generating an electric pulse for each pin hole detected, means for producing an electric pulse for each increment of length of said moving strip, a preset counter, means connecting the output of said last named means to said preset counter, said preset counter producing an output pulse each time a preselected number of pulses are counted by said preset counter, a one shot multivibrator, means for impressing said output pulse on said multivibrator, means operable by said multivibrator for resetting said preset counter, a flip-flop connected to said multivibrator, means connecting the output of said means operable by said pin hole detector to said flip-flop, said flip-flop developing an output signal when a pin hole occurs in a predetermined length of strip, a second counter for counting the number of predetermined lengths of strip containing pin holes, means connecting the output of said flip-flop to said second counter, a read out connected to the output of said second counter, a third counter for counting the total number of pin holes in the strip, means connecting the output of said means operable by said pin hole detector to said third counter, and a read out connected to the output of said third counter.

2. Apparatus for evaluating a moving metal strip according to claim 1 including a printer connected to the outputs of said read outs, and means for returning the parts to their original condition after the printer has been operated and a strip evaluated.

References Cited in the file of this patent
UNITED STATES PATENTS

| | | |
|---|---|---|
| 2,430,526 | Mirfield et al. | Nov. 11, 1947 |
| 2,890,409 | Van Krevelen | June 9, 1959 |
| 2,910,908 | Meyer | Nov. 30, 1959 |
| 2,958,785 | Camp | Nov. 1, 1960 |
| 3,019,346 | Laycak | Jan. 30, 1962 |
| 3,019,347 | Laycak | Jan. 30, 1962 |
| 3,020,033 | McCreanor et al. | Feb. 6, 1962 |
| 3,066,225 | Uphoff | Nov. 27, 1962 |